United States Patent [19]

Berti

[11] Patent Number: 4,616,277
[45] Date of Patent: Oct. 7, 1986

[54] DISK DRIVE STORAGE SYSTEM HAVING MEANS FOR COMPENSATING FOR SEEK DRIVING FORCES COUPLED BETWEEN HEAD ACTUATORS

[75] Inventor: Eugenio Berti, San Jose, Calif.

[73] Assignee: Memorex Corporation, Santa Clara, Calif.

[21] Appl. No.: 621,022

[22] Filed: Jun. 15, 1984

[51] Int. Cl.[4] .................... G11B 21/08; G11B 21/02
[52] U.S. Cl. ................................. 360/78; 360/75; 360/77; 318/625
[58] Field of Search ................................. 360/75–78, 360/97, 98, 104–106, 109; 318/625

[56] References Cited

U.S. PATENT DOCUMENTS 4,075,517  2/1978  Adler ............................... 360/106
4,136,293  1/1979  Patel ................................ 360/97

FOREIGN PATENT DOCUMENTS 56-44170  4/1981  Japan ............................... 360/98

OTHER PUBLICATIONS

Patent Abstracts of Japan, vol. 6, No. 5 (P-97) [883] Jan. '82, & JP-A-56-130865 on p. 98P97.
IBM TDB, vol. 15, No. 3, "Balanced Force Voice-Coil Actuator", Frater, 8/72, p. 749.

Primary Examiner—Raymond F. Cardillo
Assistant Examiner—Steven R. Garland
Attorney, Agent, or Firm—Nathan Cass; David W. Heid; Kevin R. Peterson

[57] ABSTRACT

Seek drive forces coupled between head actuators in a magnetic disk storage system employing separately controllable head actuators are prevented from affecting reliable head actuator operation. For this purpose a compensating signal is derived proportional to the driving current employed in performing an actuator seek operation. This compensating signal is fed forward into the drive circuit of the other actuator so as to cause this other actuator to begin moving its heads in a direction opposite to that which would be caused by the later arriving coupled drive forces, thereby making it possible to prevent driving forces coupled between actuators from deleteriously interferring with reliable actuator operation.

11 Claims, 2 Drawing Figures

DISK DRIVE STORAGE SYSTEM HAVING MEANS FOR COMPENSATING FOR SEEK DRIVING FORCES COUPLED BETWEEN HEAD ACTUATORS

REFERENCE TO OTHER PATENTS AND APPLICATIONS OF GENERAL INTEREST

The commonly assigned U.S. Pat. No. 4,375,611, issued Mar. 1, 1983 for "Protected Servo Mechanism", G. H. Greig, inventor, and copending U.S. patent application Ser. No. 512,873, filed July 12, 1983 now U.S. Pat. No. 4,553,181 for "Disc Drive Positioning System Providing Passive Head Crash Protection", E. Berti, inventor, are broadly related to the field of this invention.

BACKGROUND OF THE INVENTION

This invention relates generally to the field of rotating magnetic storage devices, and more particularly to improved means and methods for increasing the reliability of a magnetic disk storage system in which a plurality of mechanically coupled, but separately driven magnetic head actuators are employed in a head/disk assembly.

A head/disk assembly typically comprises one or more commonly driven magnetic disks rotatable about a common spindle and cooperating with at least one head actuator for moving a plurality of heads radially relative to the disks so as to provide for the reading and/or writing of data on selected circular tracks provided on the disks. Where a plurality of head actuators are employed, they are located at different circumferential positions relative to the disks. Also, in order to obtain greater system flexibility, it is advantageous to provide for each head actuator to be separately controllable so that its respective heads can be moved to a desired track irrespective of the track position provided by any other head actuator for its respective heads.

Where a plurality of separately controllable head actuators are provided, they are typically mounted on a common (or mechanically interconnected) base structure. Thus, the driving of one head actuator will cause at least some portion of the mechanical driving forces to be coupled to other head actuators via the common base structure. A head/disk assembly and its associated servo control are typically constructed and arranged so that coupling forces produced as a result of driving a head actuator does not deleteriously affect the operation of any other head actuator.

However, because of the demand for greater data storage density and faster access speed in a disk storage system, head/disk assemblies are being designed with reduced track-to-track spacings to increase density and larger actuator driving forces to reduce access time. As a result, the driving forces coupled from one head actuator to another are that much more difficult to handle. For example, it has been found that when a head actuator is to be driven an appreciable radial distance, the large driving force required to provide rapid access may cause a sufficiently large force to be coupled to another head actuator so as to displace its heads off their current track by an amount which cannot be compensated for by the servo control. Of course, it may be possible to redesign the mechanical structure of the head/disk assembly and/or the servo control circuitry to prevent this from happening, but the expense will be considerable, particularly since redesign typically requires extensive testing and field experience to insure reliability.

SUMMARY OF THE INVENTION

It is accordingly a broad object of the present invention to provide improved means and methods for preventing the operation of one of a plurality of mechanically coupled head actuators in a disk storage system from deleteriously affecting the operation of another head actuator.

A more specific object of the invention is to provide improved means and methods for preventing even large driving forces applied to a head actuator from interfering with the operation of another mechanically coupled head actuator.

Another object of the invention is to provide for the accomplishment of the foregoing objects in a relatively simple and inexpensive manner.

The above objects are achieved in a particular preferred embodiment of a two-actuator head/disk assembly in accordance with the invention by providing for operation such that, whenever a seek operation is to be performed by one head actuator, a compensating signal is fed forward to the drive circuitry of the other head actuator so as to prevent its being deleteriously affected by mechanical forces coupled thereto as a result of the performance of the seek operation by the other actuator.

The specific nature of the invention as well as other objects, features, advantages and uses thereof will become apparent from the following more detailed description of the invention taken in conjunction with the accompanying drawings.

DETAILED DESCRIPTION

Figure 1:
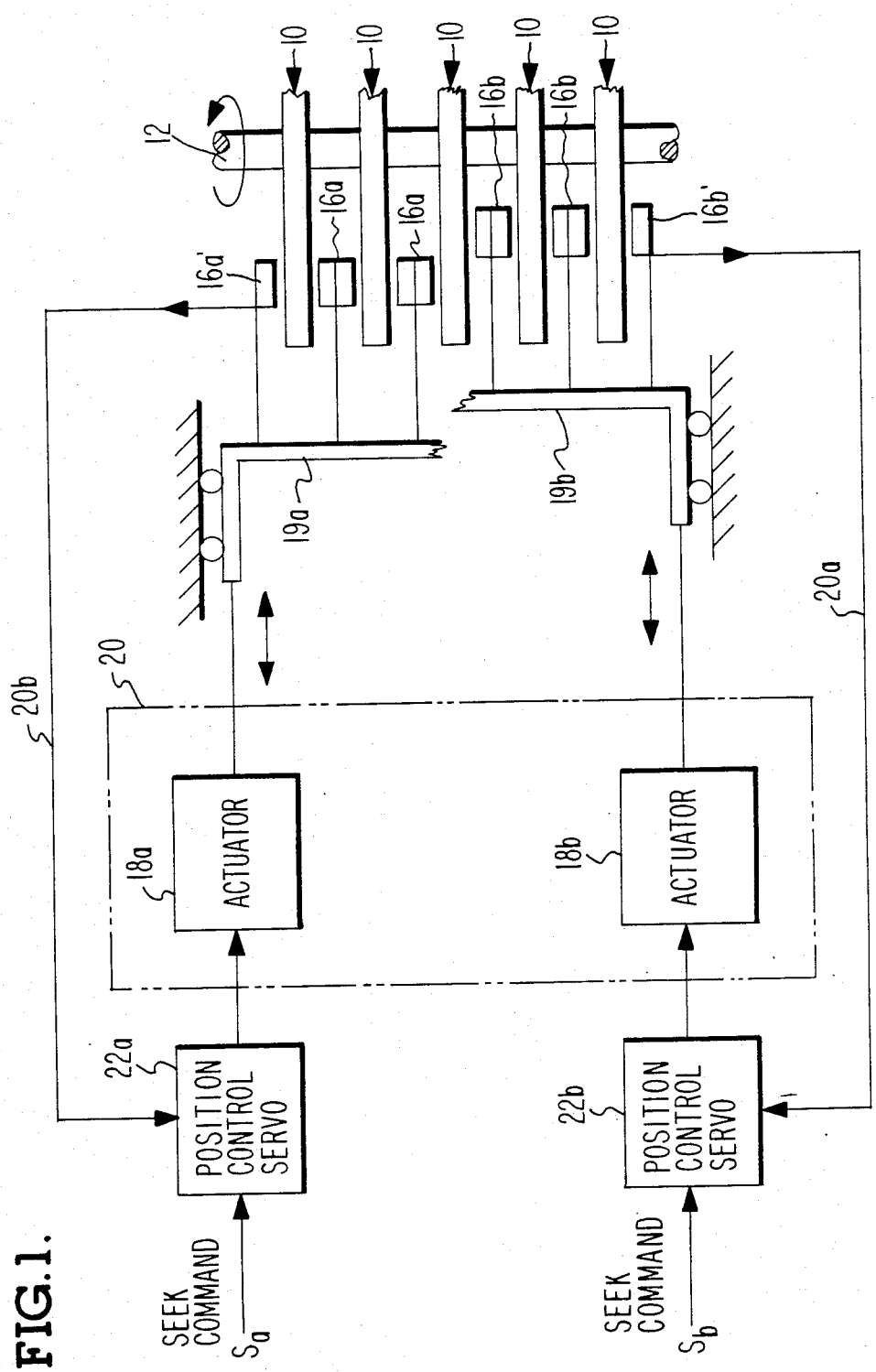
FIG. 1 is a block and schematic diagram of portions of a prior art disk storage system pertinent to the present invention.

Referring initially to FIG. 1, illustrated therein is a block diagram showing pertinent components of a prior art magnetic disk storage system. FIG. 1 illustrates a head/disk assembly 8 including a stack of spaced concentric magnetic disks 10 mounted to a rotatable spindle 12 for common rotation thereby. The head/disk assembly 8 includes a first group of magnetic heads 16a in transducing relation with particular ones of the disks 10 and constructed and arranged to be radially moved in unison by a first head actuator 18a to which the heads 16a are mechanically coupled via a first linearly movable carriage 19a. The head/disk assembly 8 also includes a second group of magnetic heads 18b in transducing relation with particular ones of the disks 10 and constructed and arranged to be radially moved in unison by a second head actuator 18b to which the heads 16b are mechanically coupled via a second linearly movable carriage 19b. The head actuators 18a and 18b are typically of the well known voice coil type and are mounted to a mechanically interconnected supporting structure generally indicated by the number 20. Each actuator is able to provide radial movement of its respective heads independently of the other actuator in response to respective drive signals Da and Db applied thereto from respective first and second head position control servo circuitry 22a and 22b.

As is conventional, one of the heads of each group (indicated in FIG. 1 as heads 16a' and 16b') is used to read servo positioning data recorded on its respective disk surface for providing servo feedback signals (20a or 20b) to its respective head position control servo circuitry (22a or 22b) for use thereby in providing output signals to its respective head actuator (18a or 18b) for maintaining its respective heads (16a or 16b) at a desired radial position (track), or for moving the heads to a commanded radial position (track) as a result of a respective seek command signal (Sa or Sb) applied thereto.

It will be understood that the above servo feedback signals 20a and 20b could alternatively be provided by incorporating servo data along with other recorded data on each disk, in which case appropriate servo feedback signals would be derived from signals read by each head during normal reading and writing operations. The reading and writing circuitry of the disk storage system is not shown in FIG. 1 since it is not pertinent to the present invention.

Disk storage systems employing components such as illustrated in FIG. 1 are currently employed in commercially available disk systems, such as for example, in 3680 disk storage units obtainable from Memorex Corporation, Santa Clara, Calif.

With regard to the driving force coupling problem considered previously herein, it will be understood that since the head actuators 18a and 18b in FIG. 1 are mechanically coupled, the performance of a seek operation by one head actuator may couple sufficient forces to the other head actuator to affect the reliable operation thereof, particularly in a high performance system which employ large seek driving forces and small track-to-track spacings.

It has been discovered that if an appropriate compensation signal is introduced into the drive circuitry of a head actuator before the arrival of the coupling forces resulting from the performance of a seek operation by the other head actuator, the effect of these coupling forces can be kept well within acceptable limits for maintaining reliable operation. It also has been discovered that an appropriate compensation signal can be introduced into the drive circuitry of each head actuator in a surprisingly simple and inexpensive way by taking advantage of existing characteristics of conventional circuitry, such as illustrated in FIG. 1.

Figure 2:
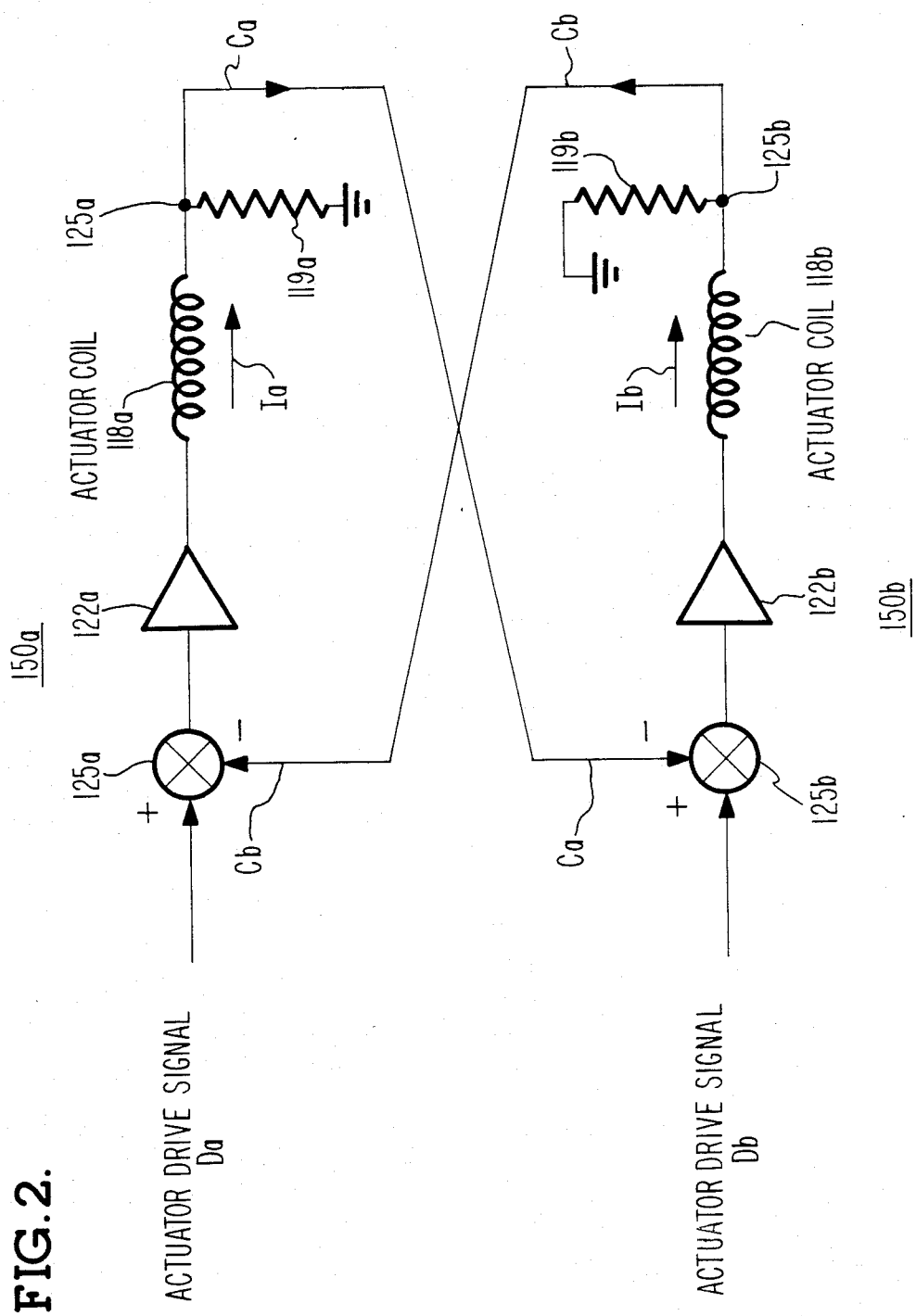
FIG. 2 is a block and schematic diagram illustrating how the present invention can advantageously be incorporated into the system of FIG. 1.

Accordingly, attention is now directed to FIG. 2 which illustrates how a particular preferred embodiment of the present invention is implemented. More specifically, FIG. 2 shows first and second circuits 150a and 150b containing pertinent portions of the head actuators 18a and 18b and their associated position control servo circuitry 22a and 22b in FIG. 1 which are involved in implementing the preferred embodiment.

Actuator coils 119a and 119b shown in FIG. 2 respectively correspond to the actuator coils of the voice coil motors 118a and 118b preferably employed for the head actuators 18a and 18b in FIG. 1. Power amplifiers 122a and 122b in FIG. 2 respectively correspond to the output power amplifiers typically employed in the last stage of the position control servo circuitry 22a and 22b in FIG. 1 for providing the relatively large drive currents Ia and Ib which are respectively applied to the actuator coils 118a and 118b for driving the respective voice coil motors 118a and 118b during a seek operation.

As also shown in FIG. 2, a respective summing circuit (125a or 125b) (which may be of conventional design) is provided at the input of each power amplifier (112a or 122b) in order to permit an appropriate compensating signal (Ca or Cb) to be summed with the normally provided actuator drive signal (Da or Db). Since, as indicated in FIG. 2, the normal drive signal (Da or Db) is applied to a positive polarity input of its respective summing circuit (123a or 123b) and the corresponding compensating signal (Ca or Cb) is applied to a negative polarity input, the resulting summed signal (Sa or Sb) which is applied to each respective power amplifier (122a or 122b) is then the difference between the normal drive signal and the compensating signal (i.e., $Sa = DA - Cb$ and $Sb = Db - Ca$).

It has been discovered in connection with the preferred embodiment being considered that appropriate signals for use as the compensating signals Ca and Cb shown in FIG. 2 can be derived in a surprisingly simple manner merely by providing an appropriately chosen resistor (119a or 119b) in series with each actuator coil 118a or 118b (as shown in FIG. 2) and then using the resulting signal produced at the juntion (125a or 125b) between each resistor (119a or 119b) and its respective actuator coil (118a or 118b) as the compensating signal (Ca or Cb) to be applied to the summing circuit (123a or 123b) of the other actuator.

Besides simplicity, the provision of compensating signals Ca and Cb in the manner illustrated in FIG. 2 is advantageous because advantage can be taken of the inherent delay occurring between the time that a seek current (Ia or Ib) appears in an actuator coil and the time that the resulting coupled forces arrive at the other actuator. This inherent delay makes it possible for the compensating signal (Ca or Cb) to be applied via the respective summing circuit (125a or 125b) to the respective power amplifier (122a or 122b) of the other actuator so as to produce a compensating drive current which, prior to the arrival of the coupled drive forces, will begin moving this actuator in a direction opposite to that which would be caused by the coupled drive forces when they arrive. The advantageous result thereby achieved by this feed forward action is that the resulting forces will be kept sufficiently small so as not to affect the reliability of operation of the actuator.

Another reason why the provision of compensating signals Ca and Cb in the manner illustrated in FIG. 2 is advantageous is because the conventional voice coil motor used in a head actuator produces output displacement forces which are approximately proportional to the current (Ia or Ib in FIG. 2) flowing in the voice coil (119a or 119b in FIG. 2). Because of this proportional relationship, the compensating signals Ca and Cb produced at the junctions 125a and 125b in FIG. 2 will be approximately correct for a wide range of different radial seek distances, thereby permitting direct coupling of the thus produced compensating signals Ia and Ib to their respective summing circuits 125b and 125a, as shown. The particular values to be used for the resistors 119a and 119b can be determined by measuring the cross-coupled transfer function of the actuators.

It is to be understood that the present invention is not limited to the particular embodiment disclosed herein since various modifications and variations in construction, arrangement and use are possible. The present invention is accordingly to be considered as including all modifications and variations coming within the scope of the invention as defined by the appended claims.

What is claimed is:

1. In a disk storage system, the combination comprising:
   at least one rotatable disk, at least first and second separately movable heads for providing transducing action with respect to said disk;
   first and second head actuators mounted so that the operation of one actuator causes mechanical forces to be coupled to the other actuator, said first actuator providing for radial movement of said first head relative to said disk and said second actuator providing for radial movement of said second head relative to said disk, the radial movement provided by each actuator being separately controllable from that of the other actuator;
   first electrical circuit driving means for driving said first actuator for controlling the radial movement of said first head;
   second electrical circuit driving means for driving said second actuator for controlling the radial movement of said second head; and
   coupling force compensating means responsive to the initiation of a change of radial position of a head by its respective electrical circuit driving means for causing a feed-forward compensating signal to be applied to the electrical circuit driving means of the other head with a polarity and magnitude chosen so that sufficient cancellation of the coupled driving forces are produced to maintain reliable head positioning operation thereof.

2. The invention in accordance with claim 1, wherein said coupling force compensating means is constructed and arranged to operate in a manner such that said compensating signal is applied to the electrical circuit driving means of said other actuator at a sufficiently earlier time than the arrival of the coupled driving forces so that, prior to the arrival of these coupled driving forces, said other actuator will begin moving its respective head in a direction opposite to that which would be caused by the coupled driving forces when they arrive.

3. The invention in accordance with claim 2, wherein each of said actuators includes a motor providing linear output driving forces which are approximately proportional to an applied driving signal, and wherein said compensating means produces said compensation signal in response to said applied driving signal.

4. The invention in accordance with claim 3, wherein said motor is a voice coil motor having a driving coil, wherein the linear output driving forces produced by said voice coil motor are approximately proportional to the current flowing in said driving coil, and wherein said compensation means produces said compensation signal in response to the current flowing in said driving coil.

5. The invention in accordance with claim 4, wherein said compensating means provides said compensating signal for each actuator by applying a signal proportional to said current to the respective electrical circuit driving means.

6. The invention in accordance with claim 5, wherein resistance means are provided for applying a signal proportional to said current to the respective electrical circuit driving means.

7. The invention in accordance with claim 1, 2, 3, 4, 5 or 6, wherein a plurality of spaced rotatable disks are additionally provided in concentric relation with said disk for rotation therewith, wherein a first plurality of heads in transducing relation with particular ones of said disks are additionally provided for radial movement by said first actuator in unison with said first head, and wherein a second plurality of heads in trsansducing relation with particular ones of said disks are additionally provided for radial movement by said second actuator in unison with said second head.

8. A method of compensating for seek operation drive forces coupled between head actuators in a disk storage system employing a plurality of concentric rotatable disks, a first head actuator for radially moving a first group of heads in transducing relation with particular ones of said disks, and a separately controllable second actuator mechanically coupled to said first actuator for radially moving a second group of heads in transducing relation with particular ones of said disks, said method comprising the steps of:
   deriving a compensating signal in response to the performance of a seek operation by a head actuator; and
   coupling said compensating signal as a drive signal to the other actuator in a feed forward direction with a polarity and magnitude chosen so that sufficient cancellation of the coupled driving forces are produced to maintain reliable head positioning operation thereof.

9. The invention in accordance with claim 8, wherein the step of coupling is such that said compensation signal is applied to said other actuator at a sufficiently earlier time than the arrival of the coupled driving forces so that, prior to the arrival of these coupled driving forces, said other actuator will begin moving its respective heads in a direction opposite to that which would be caused by the coupled driving forces when they arrive.

10. The invention in accordance with claim 8 or 9, wherein said step of deriving is such that said compensation signal is approximately proportional to the output driving forces applied to the actuator which is to perform a seek operation.

11. The invention in accordance with claim 10, wherein each actuator includes a voice coil motor producing output drive forces which are approximately proportional to the current flowing in the voice coil of said motor, and wherein said step of deriving is such that said compensating signal is proportional to said current.

* * * * *

UNITED STATES PATENT AND TRADEMARK OFFICE
CERTIFICATE OF CORRECTION

PATENT NO. : 4,616,277

DATED : October 7, 1986

INVENTOR(S) : Eugenio Berti

It is certified that error appears in the above-identified patent and that said Letters Patent is hereby corrected as shown below:

Col. 4, line 17, change "Sa = DA" to --Sa = Da--.

Signed and Sealed this

Twenty-third Day of December, 1986

Attest:

DONALD J. QUIGG

Attesting Officer    Commissioner of Patents and Trademarks